United States Patent [19]
Lynch et al.

[11] Patent Number: 5,240,365
[45] Date of Patent: Aug. 31, 1993

[54] BALE SPIKE FRAME

[75] Inventors: Bobby R. Lynch; Robert L. Lynch, both of Ozark, Mo.

[73] Assignee: TRI-L Manufacturing, Inc., Ozark, Mo.

[21] Appl. No.: 826,401

[22] Filed: Jan. 27, 1992

[51] Int. Cl.⁵ .............................................. A01D 87/12
[52] U.S. Cl. .................................... 414/24.5; 294/120
[58] Field of Search ......... 414/24.5; 294/61, 120–122, 294/126

[56] References Cited

U.S. PATENT DOCUMENTS

| | | | |
|---|---|---|---|
| 4,120,405 | 10/1978 | Jones | 414/24.5 |
| 4,256,426 | 3/1981 | Buss | 414/24.5 |
| 4,674,786 | 6/1987 | Lynch | 414/24.5 |
| 5,129,775 | 7/1992 | Coats et al. | 414/24.5 |
| 5,178,505 | 1/1993 | Smith | 414/24.5 |

FOREIGN PATENT DOCUMENTS 1189030  6/1985  Canada .............................. 414/24.5

*Primary Examiner*—Robert P. Olszewski
*Assistant Examiner*—Steven M. Reiss
*Attorney, Agent, or Firm*—Harold F. Mensing

[57] ABSTRACT

A bale spike frame for lifting and carrying bales weighing 2,000 pounds or more. The frame members are tied together and reinforced at strategic locations by an integrating plate. The frame is a welded assembly made basically of tubular steel stock having a square cross section and also of some steel plate stock. It has elongated tubular top and bottom members joined to shorter length plate members at their ends to form a rectangular frame. A main bale spike mounting socket is provided in the top frame member and two tubular inserts are provided in the lower frame member for attaching bale stabilizing spikes. An intermediate frame member located directly below the socket extends perpendicularly between the top and bottom frame members and is butt welded thereto. Peripherally welded integrating plates extend from below the bottom end of the intermediate frame member over its front and rear faces and onto the top surface of the top frame member. These plates have socket apertures that are fitted around the main bale spike socket which is in turn peripherally welded to the surfaces of these plates. Structure for attaching the bale frame to a farm vehicle is provided at opposite ends of the frame.

7 Claims, 1 Drawing Sheet

BALE SPIKE FRAME

BACKGROUND OF THE INVENTION

This invention relates to a bale spike frame for mounting on a farm vehicle. More specifically, it relates to a reinforced frame designed to hold at least one cantilevered high strength bale pick-up spike for carrying a large bale of hay or the like.

In the care and feeding of livestock, its has become increasingly popular to use large round bales of hay and straw rather than the smaller old style wire-bound rectangular bales. The trend over the years even in the round bales is to produce larger and larger ones for the sake of efficient handling. For example, the latest equipment is capable of producing bales which weigh in excess of 2,000 pounds as opposed to those in the past having a maximum weight substantially less than 2,000 pounds. These larger bales presented problems for the existing handling equipment. Bale spikes made of steel other than high strength steel and supported only at their base ends were subject to severe bending and soon became unusable. Some of the large bales were very tightly compacted and this made it difficult for those bale spikes having an underlying gusset, supporting a portion of the main bale spike, to fully penetrate or spear the bale so it could be lifted and carried safely. Bale pick-up frames having cantilevered main bale spikes of sufficient strength to require support only at it their base ends placed so much stress on the frame in the area of the sockets that failures resulted.

Accordingly, it is an object of this invention to produce an improved bale spike frame which is capable of reliably supporting and carrying a bale weighing in excess of 2,000 pounds.

It is another object of this invention to provide a heavy duty bale spike frame which has been reinforced in critical areas to increase its durability, yet is both relatively light in weight and economical to produce.

SUMMARY OF THE INVENTION

Generally speaking, the bale spike frame of this invention is a welded assembly made basically of tubular steel stock having a square cross section and also of some steel plate stock. It has elongated tubular top and bottom members joined to shorter length plate members at their ends to form a rectangular frame. A main bale spike mounting socket is fitted snugly in an aperture extending through front and rear portions of the top frame member midway between its ends. An intermediate frame member located directly below the socket aperture extends perpendicularly between the top and bottom frame members and is welded thereto. Peripherally welded integrating plates extend from below the bottom end of the intermediate frame member over its front and rear faces and onto the top surface of the top frame member. These plates have socket apertures that are fitted around the main bale spike mounting socket which is in turn peripherally welded to the surfaces of these plates. A pair of tubular inserts for mounting bale stabilizing spikes are provided in the lower frame member equidistant from its longitudinal center. Means for attaching the bale frame to a farm vehicle are provided at opposite ends of the frame.

The various features of this invention and their advantages will be understood best if the following description is read with reference to the accompanying drawings, which illustrate a preferred embodiment.

DETAILED DESCRIPTION OF THE INVENTION

Figure 3:
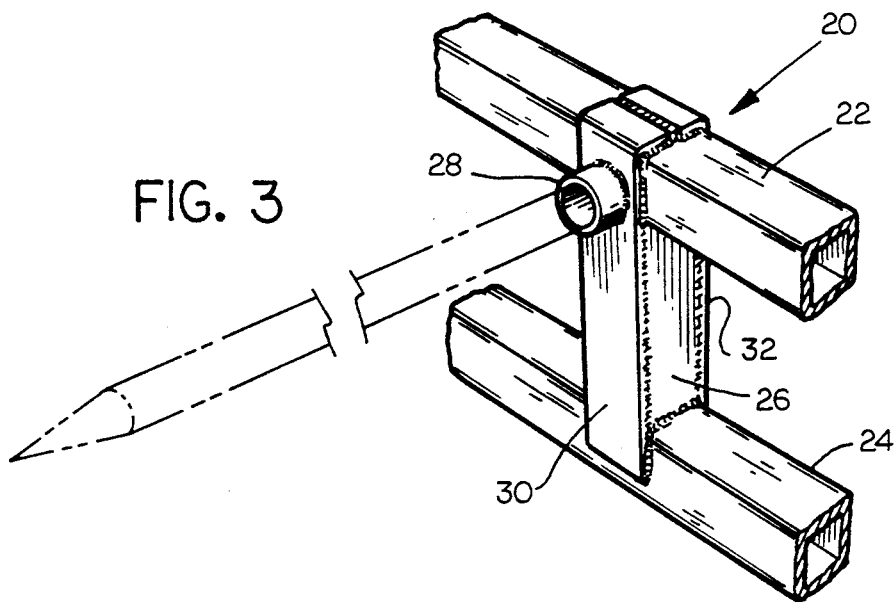
FIG. 3 is an enlarged perspective view of only the central portion of the bale spike frame.
Figure 2:
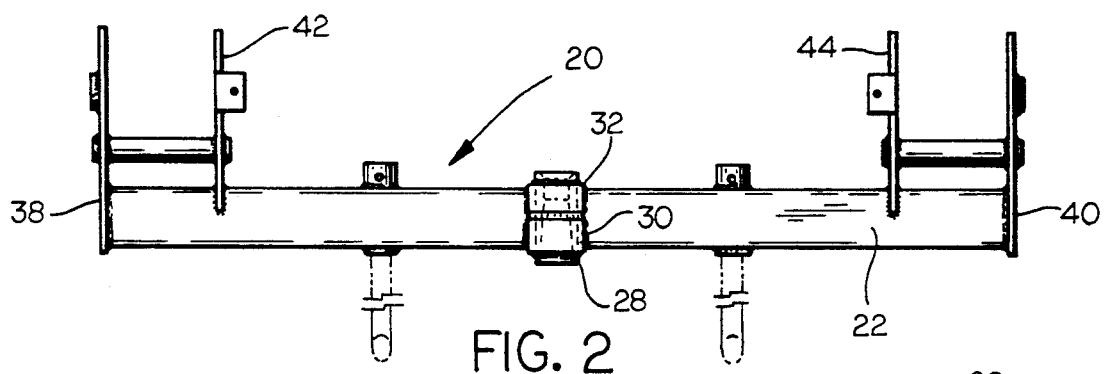
FIG. 2 is a plan view of the bale spike frame shown in FIG. 1.
Figure 1:
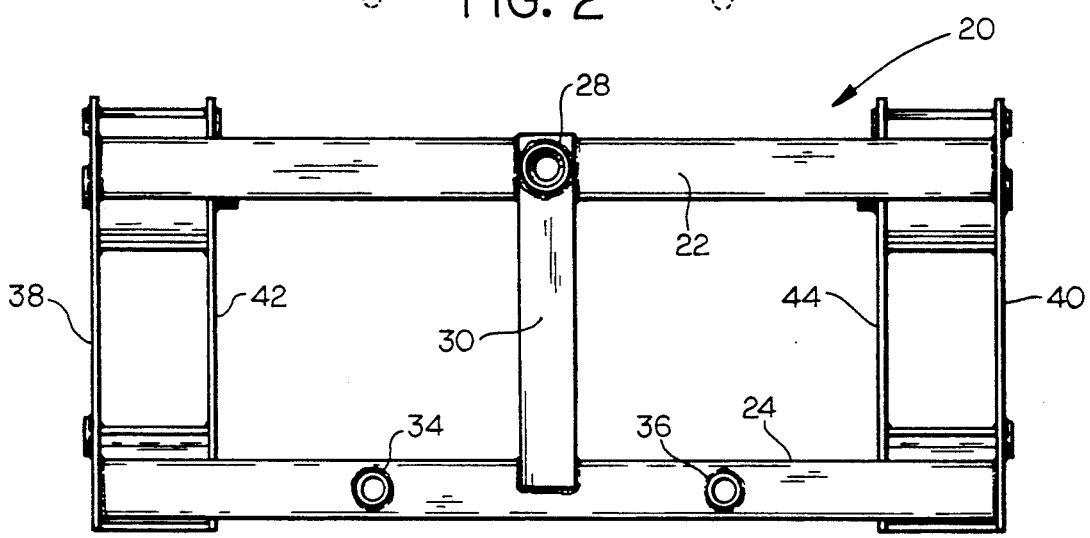
FIG. 1 is a face view of the bale spike frame of this invention.

The drawings illustrate a bale spike frame 20 having two elongated laterally spaced apart parallel frame members 22, 24 of equal length. They are made of tubular steel stock having a square cross section. A central frame member 26, made of the same stock, extends laterally between the center sections of top frame member 22 and bottom frame member 24. Its ends are butt welded around their periphery to the abutting and adjoining surfaces of the top and bottom frame members respectively, such that the facial surfaces of the central frame member lie in the same planes as the corresponding surfaces of the elongated members of the frame.

Aligned apertures located in the front and rear faces of the top member, directly above the centerline of the central frame member, are sized to snugly contain a mounting socket 28 for holding therein the base end of a removable main bale spike (shown in phantom lines) made of high strength steel capable of lifting and carrying a bale weighing in excess of 2,000 pounds without taking a permanent set. The socket provides the only support for the cantilevered main bale spike and projects a minimum distance in front of the frame. For example, a socket with a cylindrical outside projects less than one diameter in front of the frame.

An integrating plate means preferably comprising two integrating plate members 30, 32, one for the front face and one for the rear face, extends from respective points below the joint between the central frame member and the bottom frame member to points on the top surface of the top frame member. In lighter duty applicatons only a front integrating plate may be needed, but even in such instances front and rear integrating plates provide added durability without a significant increase in weight or cost. Preferably, the width of the integrating plate members is substantially the same as the width of the central frame member. These integrating plate members have socket apertures corresponding to those in the top frame member. The diameters of the socket apertures are less than the width of the central frame member and the socket length is great enough to allow its ends to protrude sufficiently beyond the outside surfaces of the integrating plates to allow the bale spike mounting socket to be welded around front and back peripheries to the adjoining outer surfaces of the plate members. Additionally, the integrating plate members are welded around their entire peripheries to the adjacent surfaces of the frame. A viable alternative to the two piece integrating plate embodiment would be to combine the two "L" shaped plate members into a single "U" shaped member.

A pair of hollow cylindical inserts 34, 36 are provided in the lower frame member equidistant from its longitudinal center for removably attaching two bale stabilizing spikes (shown in phantom lines). These stabilizing spikes are generally shorter and of smaller diameter than the main bale spike and, although they do support a portion of the bale's weight, comparatively less strain is placed upon them individually. Consequently, The structural requirements are not as great as those for the main bale spike. However, the lower frame member is reinforced midway between them by the fact that the integrating plate means extends over a portion of the lower frame member and is welded thereto.

The outer ends of the top and bottom frame members are butt welded to two end plate members 38, 40. These end plates in conjunction with two intermediate plate members 42, 44 comprise the means for attaching the frame. The attaching means may be modified to adapt it to specific hookups.

Although a preferred embodiment of the improved bale spike frame of this invention has been described and illustrated, it is to be understood that minor modifications may become apparent to those skilled in the art and these modifications may be made without departing from the scope of this invention which is primarily defined by the appended claims.

What is claimed is:

1. An improved bale spike frame comprising: two spaced apart elongated tubular steel frame members disposed parallel to one another, a tubular central frame member of shorter length extending perpendicularly between said elongated frame members midway between their ends, said central frame member being butt welded to said elongated frame members, an integrating plate means having a plate member lying flat against the frame and extending from a point below the junction of the central frame member with said lower frame member upwardly over a front face of said central frame member thence laterally to a point on the top surface of said upper frame member, said integrating plate means being peripherally welded to adjoining surfaces of said frame members, a socket for holding the base end of a removable elongated main bale spike, said socket being peripherally welded to an adjoining surface of said integrating plate means, and a means for attaching said frame to a vehicle.

2. An improved bale spike frame according to claim 1, wherein said integrating plate means further includes a plate member extending over a rear portion of the frame from a point below the junction of the central frame member with said lower frame member upwardly over the rear face of said central frame member to a point on the top surface of said upper frame member.

3. An improved bale spike frame according to claim 1, wherein said plate member has a width substantially the same as that of said central frame member.

4. An improved bale spike frame comprising: two spaced apart elongated frame members of equal length disposed parallel to one another, said members being made of tubular steel stock having a square cross section, a central frame member extending perpendicularly between said elongated frame members midway between their ends, said central frame member being made of the same stock but of shorter length, said central frame member being butt welded to said elongated frame members, an integrating plate means having a plate member with a first planar section extending over the front portion of the frame from a point below the junction of the central frame member with said lower frame member upwardly over the front face of said central frame member and a laterally disposed second planar section extending to a point on the top surface of said upper frame member, said integrating plate means being peripherally welded to adjoining surfaces of said frame members, a socket for holding the base end of a removabe elongated main bale spike said socket being peripherally welded to said integrating plate means, and a means for attaching said frame to a vehicle.

5. An improved bale spike frame according to claim 4, wherein said integrating plate means further includes a plate member extending over a rear portion of the frame from a point below the junction of the of the central frame member with said lower frame member upwardly over the rear face of said central frame member to a point on the top surface of said upper frame member.

6. An improved bale spike frame according to claim 5, wherein said socket member is welded around its periphery to both of said integrating plate members.

7. An improved bale spike frame according to claim 4, wherein said integrating plate means has a width substantially the same as that of said central frame member.

* * * * *